United States Patent [19]

Stephenson

[11] Patent Number: 5,217,208
[45] Date of Patent: Jun. 8, 1993

[54] CONSTANT TENSION WINCH HAVING AN ANTI-THEFT MECHANISM

[75] Inventor: Everett H. Stephenson, Savannah, Ga.

[73] Assignee: Union Camp Corporation, Wayne, N.J.

[21] Appl. No.: 656,932

[22] Filed: Feb. 15, 1991

[51] Int. Cl.⁵ .................. B66D 5/32; B61D 45/00
[52] U.S. Cl. .................... 254/213; 254/364; 254/376; 410/103; 242/107
[58] Field of Search .......... 254/213, 364, 376, 323; 242/107; 410/100, 103

[56] References Cited

U.S. PATENT DOCUMENTS

| 565,064 | 8/1896 | Wright et al. | 242/107 |
|---|---|---|---|
| 2,991,975 | 7/1961 | Alexander | 410/103 |
| 3,827,650 | 8/1974 | Stevens et al. | 242/107 X |
| 4,063,712 | 12/1977 | Arbogast | 410/103 X |
| 4,382,736 | 5/1983 | Thomas | 410/100 X |

FOREIGN PATENT DOCUMENTS 2612627 3/1976 Fed. Rep. of Germany ...... 242/107

Primary Examiner—Katherine Matecki
Attorney, Agent, or Firm—William K. Wissing

[57] ABSTRACT

Methods and apparatus for maintaining a restraining device placed over a load in constant tension as the load shifts during transit are disclosed. The present invention provides a winch having two ratchets, the first of which provides the initial tension in the restraining device. The second ratchet is connected to a spring, which is connected to the shaft upon which the restraining device is wound. By operating the second ratchet, the spring is displaced and an urging force is created. Upon a reduction of the initial tension in the restraining device, the urging force acts upon the shaft, advancing the shaft and the first ratchet, thereby maintaining the tension in the restraining device. Since the first ratchet is advanced, any slack in the restraining device is accumulated and the strap is locked into a tighter position. Methods and apparatus providing a locking bar to prevent unauthorized use of the winch and theft of the restraining device are also disclosed.

10 Claims, 3 Drawing Sheets

CONSTANT TENSION WINCH HAVING AN ANTI-THEFT MECHANISM

The present invention relates to methods and apparatus for restraining a load, and more specifically, the present invention relates to apparatus for applying tension to a cable or strap for restraining a load and preventing the unauthorized use or theft of the restraining means.

BACKGROUND OF THE INVENTION

Numerous types of materials, such as timber, lumber, bricks, pallets, pipe, I-beams and other structural components, as well as manufactured goods of many types, are transported in bulk by road or rail. A frequent loading configuration is to stack a quantity of material on a flat bed or platform and attempt to restrain the load using one or more cables, chains or straps attached to the sides of the platform. Typically, ratchet winches are provided which permit the restraining means to be placed in tension over the load and prevent the release or counter rotation of the winch. In transit, however, the load may shift or settle, causing the tension in the load restraining means to be reduced, i.e., to slacken, permitting further shifting of the load. This is a highly undesirable and unsafe condition.

Others have attempted to provide devices which maintain a cable, chain, strap or other means for restraining a load in tension against a shifting load. For example, U.S. Pat. No. 2,991,975 discloses a load binder for retaining cables under tension. The device disclosed provides a primary ratchet which is used to initially tighten a cable. Subsequent tightening is accomplished using a set of gears, which multiply the torque applied to permit a greater tension than would be obtained by the primary ratchet alone. Disposed coaxially between a shaft and the cable spool is a coil spring. As the primary ratchet is initially manipulated, the spring begins to be "wound." When the spring has reached the limit of available rotation, the torque is then transferred to the cable spool and initial tension is placed on the cable. If the load shifts, the built up tension in the spring urges against the cable spool and maintains tension proportional to the spring force. A disadvantage of this design is the requirement that a maximum torque be applied to the spring each time the device is used.

U.S. Patent Re. 30,307 discloses a cable take up load binder directed to maintaining a cable or chain in tension against a possibly shifting load. The device utilizes a torque spring positioned between the take up spool and a secondary ratchet means, which is in addition to a primary ratchet means which applies and locks the winch spool in place. The second ratchet is used to apply a load to the torque spring, which is wound coaxial with the winch spool. The winch spool may rotate independently of the primary ratchet, however. Thus if the chain or cable loosens, the force provided by the torque spring rotates the winch spool, but not the primary ratchet.

A problem with both these designs is that the amount of torque applied and the rotation the winch spool can undergo to take up slack are limited by the design of the torque spring. Under certain conditions, after the spring has already "unwound" the spring force may not sufficiently tension the cable or chain and, since the primary ratchet which restrains the cable spool has not been advanced, the restraining means may slip back—limited only by the initial setting of the primary ratchet.

A further recurring problem with the cable tension winches described above is that most designs leave the cable, chain or strap exposed to theft. It is impractical to lock each cable end to the winch body after the load is removed. Since the winches are part of transportation equipment which is used in numerous locations which are often many miles apart and by numerous individuals who may be employed by a number of different entities, it would be impractical to maintain individually keyed locks. If the locks were sufficiently standardized, it would become commensurately less difficult for thieves to obtain keys. Locks also add an unnecessary time consuming operation to the loading and unloading process. Even in those designs providing winch covers, therefore, locks remain impractical. It would therefore be desirable to provide a locking mechanism which would deter casual theft, but which would be conveniently operable by those closely related to the transportation system.

SUMMARY OF THE INVENTION

Accordingly, it has now been found that a constant tension winch apparatus for manipulating a restraining means for restraining a load which overcomes the limitations discussed above can be constructed. Preferably, a winch made in accordance with the present invention comprises a frame comprising at least two parallel spaced apart side plates, each of the side plates comprising means for receiving a shaft. A shaft means for retaining a restraining means, the shaft means having two ends extending through the means for receiving a shaft and further comprising adaptor means for receiving means for applying torque is placed between the plates, and a restraining means for restraining a load having a first end affixed to the shaft and a distal end is wound around the shaft. The restraining means is preferably manipulated by the operation of a first ratchet wheel affixed to a first end of the shaft and engages with a first ratchet pawl means.

In accordance with the present invention, a second ratchet wheel is affixed to an adaptor means for receiving means for applying torque, and a second ratchet pawl for engaging the second ratchet wheel is also provided. A spring means for exerting a force between the second ratchet wheel and the shaft provides a force when displaced by the operation of the second ratchet wheel. In a preferred embodiment of the apparatus of the present invention, the spring means comprises a coil spring disposed between a side plate and the second ratchet wheel and a spring cover plate affixed to the second ratchet wheel to which an end of the coil spring is affixed. A spring stop is preferably removably attached to the spring cover plate so that upon one full rotation of the cover plate the spring stop will contact a spring stop block which is fixedly attached to a spring collar. The spring stop and spring stop block provide a means for protecting the coil spring from excessive torque. In operation, the restraining means is placed in tension by operation of the first ratchet wheel, and the spring means is displaced to create an urging force. Upon the reduction of the tension in the restraining means, the spring causes the shaft to rotate and advance the first ratchet wheel, restoring the tension.

In certain embodiments of the present invention, the restraining means is provided with a hook affixed to the distal end of the restraining means. The apparatus also preferably comprises a hinged cover plate disposed between the side plates, to which a locking bar may be affixed. Preferred embodiments of the present invention thus provide an anti-theft feature since the hook is engageable with the locking bar, thus when the restraining means is placed in tension, the hinged cover is prevented from being removed by unauthorized persons. Those persons authorized to use the winch will be aware that the ratchet means may be released, permitting the cover to be opened and the restraining means withdrawn.

In certain preferred embodiments, a guide means for preventing the abrasion of the restraining means is also provided. Most preferably, the guide means is attached to the hinged cover.

In another aspect of the present invention, the first and second pawls comprise a tooth means for engaging their respective ratchet wheels to regulate the direction of the ratchet wheel's rotation. A pawl stop is employed to limit the pawl rotation in a backward direction to eliminate the possibility that the pawl will inadvertently engage the ratchet wheel while the restraining mean is being withdrawn. Alternatively, each pawl further comprises an arcuate cut out section opposite the tooth means which reduces the likelihood of the pawl being "bumped" into an engaged position while the restraining means is being withdrawn.

Thus, a constant tension winch means in accordance with the present invention comprises a winch frame, a restraining means, a shaft for retaining a restraining means, and spring mechanism means for applying a constant tension to the restraining means. The spring mechanism preferably comprises a first ratchet means directly connected to the shaft which limits rotation in a first direction, a second ratchet means rotatably connected to the shaft which limits rotation in the first direction, and a spring means for urging against the second ratchet means and the shaft. In use, an initial tension is created in restraining means by the operation of the first ratchet means and an urging force is created by rotating the second ratchet means to displace the spring. Upon a reduction in the tension of the restraining means the spring causes the rotation of the shaft and the first ratchet means.

The present invention also provides methods of maintaining a restraining means in tension over a load and methods of deterring theft of straps when winch is not in use and preventing the unauthorized use of a winch.

DETAILED DESCRIPTION OF THE PREFERRED EMBODIMENTS

Figure 1:
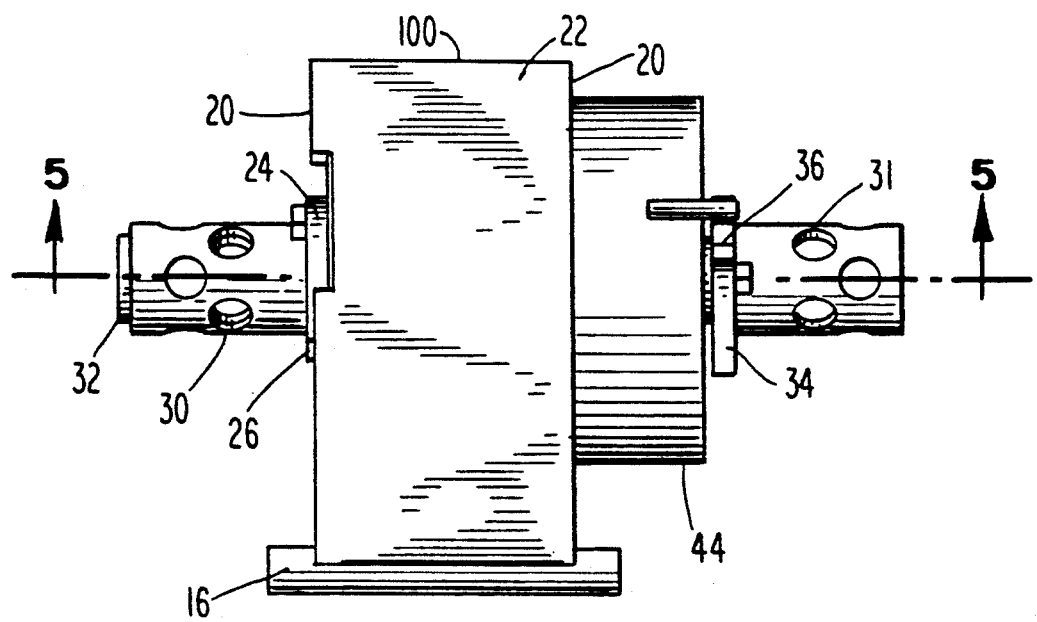
FIG. 1 is a top plan view of the winch.
Figure 2:
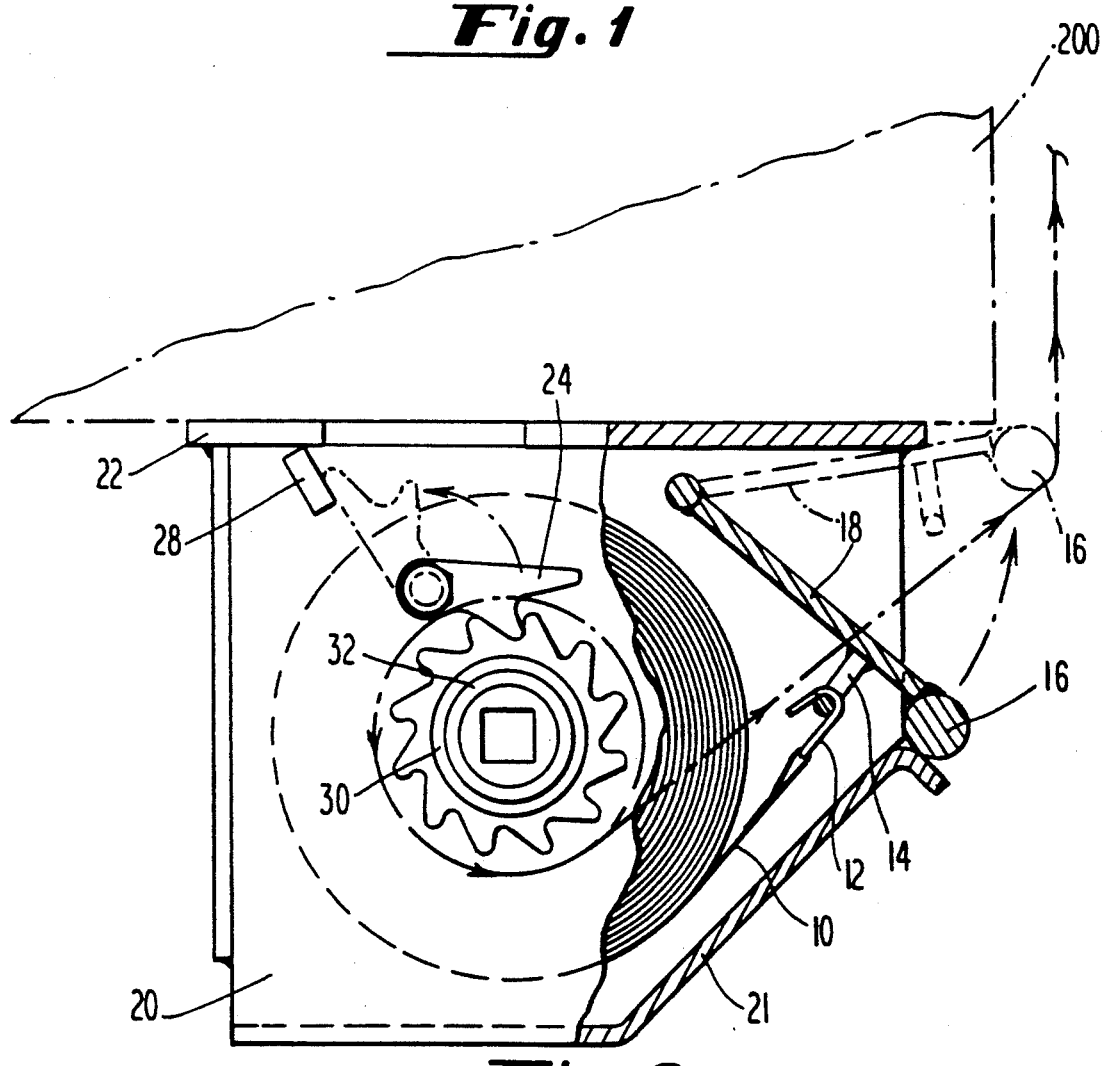
FIG. 2 is a partially cutaway side elevation view of the winch showing the operation of the hinged cover plate, the first ratchet and pawl, and the locking bar.

Referring now to FIG. 1, there is shown a top view of a constant tension winch assembly made in accordance with the present invention. The winch includes a substantially enclosed casing 100 preferably formed by two parallel side plates 20, which are preferably connected by a top plate 22, a bottom plate 21 (FIG. 2), and a hinged cover plate 18 (FIG. 2). In certain embodiments, however, it may be preferred to omit one or more sections of the side or hinged cover plates 20, 18, illustrated in FIGS. 1 and 2. A shaft 32 is placed through the casing 100 and is held between the two parallel side plates 20. Preferably the end of the shaft 32 extends through the side plates 20 and includes a first adaptor means 30 for applying a torque to the shaft 32 and a second adaptor means 31 also provided for applying a torque to the shaft 32. Preferably a spring housing 44 is provided to cover a spring means (illustrated in FIG. 5).

Referring now to FIG. 2 a partially cutaway side elevation view of the winch device is shown depicting the interactive operation of a hinged cover plate 18 having a locking bar 14 attached thereto, means for restraining a load 10, first ratchet 26 and first pawl 24. The restraining means 10 may be a strap as is illustrated. Other restraining means 10 which might be substituted include cable, rope, chain, and numerous other restraining means familiar to those of ordinary skill. The restraining means 10 is preferably terminated with a hook 12 which cooperates with a mating portion (not illustrated) to affix the distal end of the restraining means 10 to a structure or to an object such as the bed of a rail-car or a flatbed trailer. Alternatively, the hook, clasp or other means 12 for attaching the restraining means 10 to an object may be eliminated entirely in certain embodiments and the restraining means 10 attached by tying a knot.

The restraining means is wound around a shaft 32, not fully visible in this view, which permits the length of the restraining means 10 to be adjusted to accommodate a particular load. Additionally, the shaft 32 functions to manipulate and control the length of the restraining means 10.

The hinged cover plate 18 provided in preferred embodiments of the present invention performs several functions. First, it provides both protection and access to the restraining means 10 when stored around the shaft 32. Second, when in use, the restraining means is preferably passed over a guide 16 formed on the surface of the hinged cover plate 18. The guide 16 is designed and positioned to ensure that when the restraining means 10 is withdrawn and placed in tension, it is not abraded or otherwise damaged by the edge of the cover plate 18 or other interfering structure. It should be noted that in FIG. 2 the restraining means 10 is depicted in a manner which best permits the illustration of the apparatus; in actual use the restraining means would preferably be passed over the guide 16 illustrated and over the load (not shown). Similarly, the guide 16 has been omitted from certain of the following drawing Figures to permit the features of those embodiments to be clearly illustrated.

As illustrated in FIG. 2, the hinged cover plate 18 of the winch assembly incorporates the anti-theft feature of the present invention. In a preferred embodiment, the locking bar 14 is mounted on the hinged cover plate 18 as shown and is constructed to cooperate and engage with the hook 12 or other means for attachment to an object affixed to the distal end of the restraining means 10. To lock the apparatus, the hook 12 is engaged with the locking bar 14, and the cover plate 18 is drawn closed while the restraining means 10 is placed in tension, as illustrated in FIG. 2. As explained more fully below, the constant tension winch of the present invention provides sufficient tension to "lock" the hinged cover in place, tending to prevent opening of the cover plate 18 and the removal of the restraining means 10 by unauthorized persons. In those embodiments where the restraining means 10 is not provided with a hook or clasp 12, the restraining means may simply be knotted to the locking bar 14. Those authorized persons familiar with the winch of the present invention and possessing a bar or other means for engaging the torque adapters 30, 31 may sufficiently release the tension on the restraining means 10 to permit the first pawl 24 to be disengaged from the first ratchet wheel 26 (and also disengaging the second ratchet 36 and pawl 34 illustrated in FIG. 3), permitting the hinged cover 18 to be opened.

The withdrawal and regulation of the restraining means is governed by the first ratchet 26 and first pawl 24 which cooperate to regulate the direction of the rotation of the shaft section 32. As illustrated in FIG. 2, the first ratchet 26 and first pawl 24 are arranged such that the restraining means 10 may be wound about the shaft 32 by applying a torque to the adaptor means 30. However, rotation of the shaft in the opposite direction, i.e., withdrawal of the restraining means 10 is resisted by the engagement of the first ratchet 26 with the first pawl 24. In certain embodiments, it may be necessary to provide a spring to urge the pawl 24 into the ratchet wheel 26. If necessary, the pawl 24 may be withdrawn by pivoting it away from engagement with the ratchet wheel, to a position of rest against the pawl stop 28, permitting the shaft 32 to rotate freely in either direction.

In operation, the distal end of the restraining means 10 is passed over the load. The resistance to rotation in this direction provided by the first ratchet 26 and first pawl 24 is removed by disengaging the ratchet from the pawl. The distal end of the restraining means 10 is then fixed to an object, using the clasp 12 or by other means. After the ratchet 26 is engaged with the pawl 24, the restraining means 10 is initially placed in tension to secure the load by applying a torque to the shaft 32, via the torque adaptor means 30, thereby causing a counter rotation of the first ratchet wheel 26. As the ratchet wheel 26 rotates in the direction of increasing tension, interaction with the first pawl 24 prevents the tension from being released. In this initial setting, the load is thus secured. However, as set forth above, the single ratchet and pawl arrangement described is insufficient to safely secure a shifting load.

Figure 3:
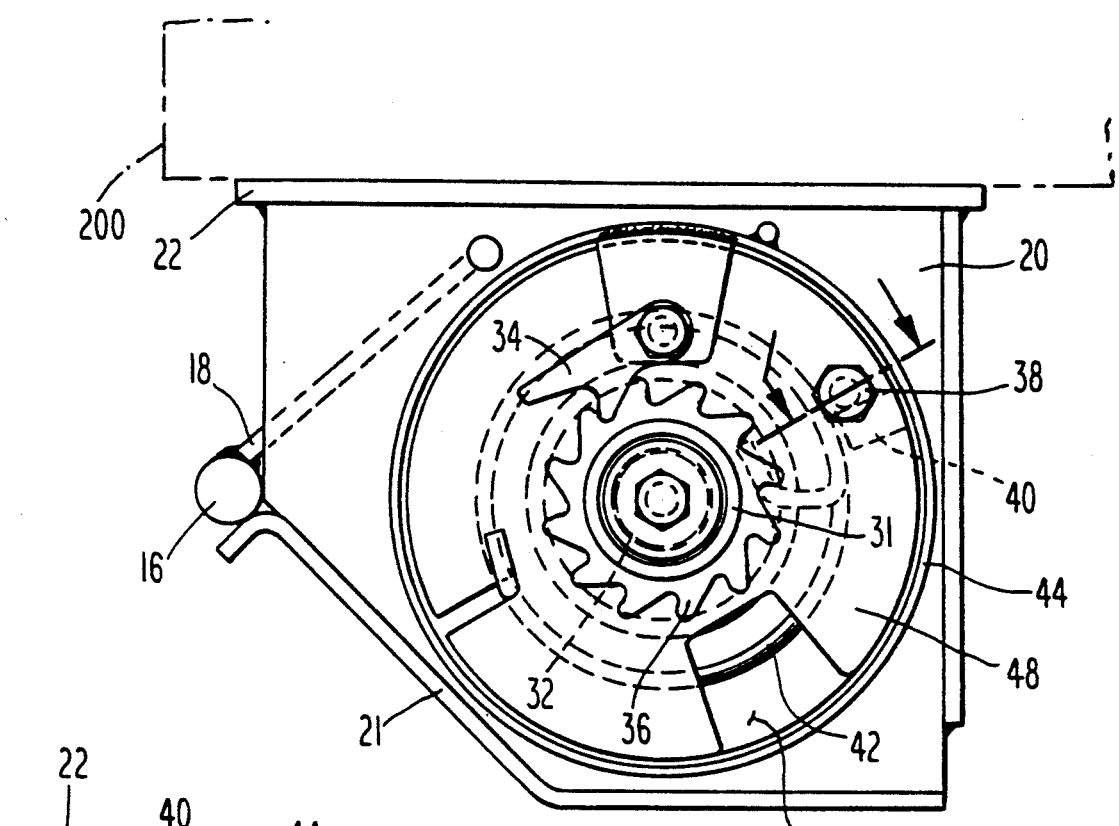
FIG. 3 is a side elevation view of the winch illustrating the side opposite that shown in FIG. 2 and the coil spring (partially in phantom).

As seen in FIG. 3, the present invention provides a second ratchet wheel 36 and a second pawl 34 which are both removably affixed to the opposite end of the shaft 32 from the first ratchet 26 and pawl 24 and provide a constant tension which advances the first ratchet wheel in the event the tension in the restraining means 10 decreases. To initially set the tension, a second adaptor means 31 for applying torque to the shaft 32 is also provided. The second ratchet wheel 36, which provides constant tension to the restraining means 10, not shown in FIG. 3, is preferably disposed on a spring cover plate 48 in accordance with the present invention.

In a preferred embodiment, a coil spring 42 (partially in phantom) is disposed between the side plate 20 and the second ratchet wheel 36. The coil spring 42 provides an increasing resistance when the ratchet 36 is advanced in the direction shown by the arrow in FIG. 3. Since the spring 42 transfers torque to the shaft 32, the tension of the restraining means 10 is maintained. When the load shifts and the initial tension of the restraining means 10 is relaxed the restraining means 10 initially slackens, however, the torque stored in the spring 42 urges against the shaft 32, causing the shaft 32 to rotate to increase the tension upon the restraining means 10 and thereby again maintains the load in a secure state. Thus, to use a winch made in accordance with the present invention an operator rotates the second ratchet wheel 36 in the direction shown by the arrow in FIG. 3. The spring 42 resists this motion; however, counter rotation is prevented by the engagement of the second pawl 34. The ratchet is rotated until a predetermined value of torque, which is related to the desired tension in the restraining means 10, is reached, or until the spring has been rotated such that the spring stop 38 contacts the spring stop block 40. At this point, with the first ratchet 26 and pawl 24 providing the initial tension and the coil spring 42 displaced to provide further force for increasing the tension of the restraining means 10, the winch of the present invention will take up any slack created in the restraining means during transit by advancing the first ratchet wheel 26.

Figure 4:
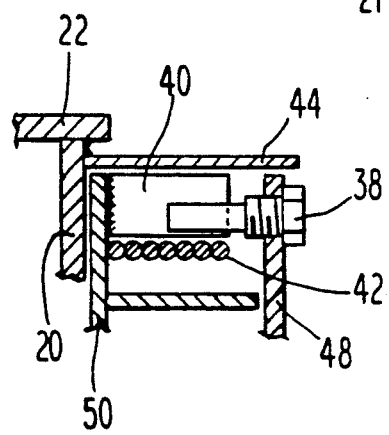
FIG. 4 is a partial cross-section view taken along line 4—4 in FIG. 3 showing the spring stop and the spring stop block.
Figure 5:
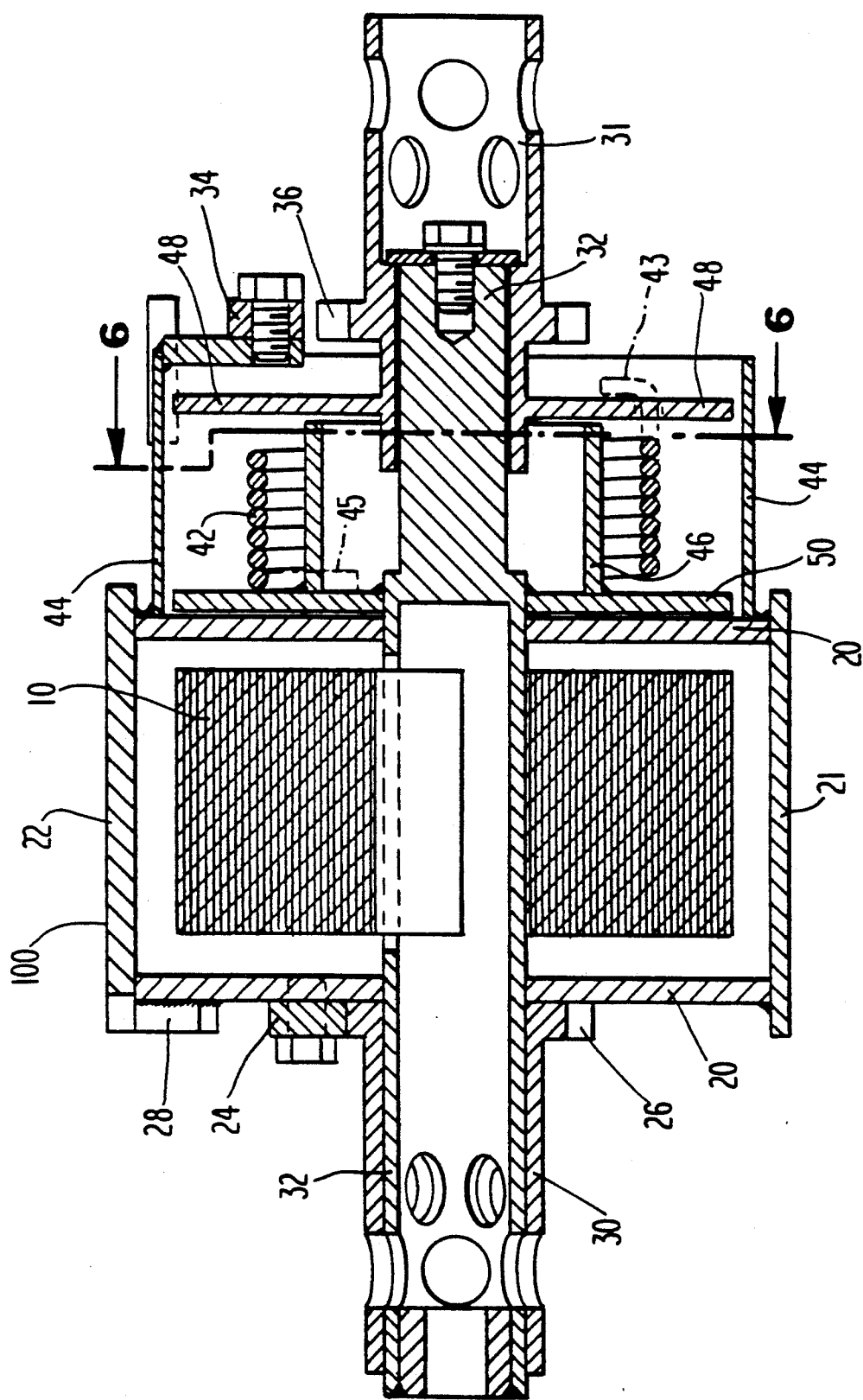
FIG. 5 is a partial cross-section of a front elevation view taken along line 5—5 in FIG. 1.

Referring to FIG. 4, a partial cross-section view taken along the line 4—4 in FIG. 3 shows in more detail the spring stop 38 and the spring stop block 40. In a preferred embodiment, the spring stop 38 and the spring stop block 40 are included in the winch device for protecting the coil spring 42 from being over wound, which would shorten the life of the spring 42. The spring stop block 40 is fixedly attached to a spring collar 50, which collar is fixedly attached to the shaft 32 such that the collar rotates with the shaft (FIG. 5). A spring stop 38 is attached to the spring cover plate 48 in such a way that rotation of the spring cover plate 48 via the second ratchet 36 will cause the spring stop 38 to come in contact with the spring stop block 40 after one full rotation of the spring cover plate 48. Preferably the spring stop 38 is removably attached to the spring cover plate 48 such that it may be removed for applying a torque to the shaft via the second adaptor means 31.

Further details of the spring means and the spring mechanism are seen in the partial cross-sectional view of FIG. 5, taken along line 5—5 in FIG. 1. As shown, the second torque adaptor 31 is fixedly attached to the spring cover plate 48. The spring housing 44, a substantially cylindrical side wall, and the spring cover plate 48 act to restrain the coil spring 42. As the cover plate 48 is rotated, the coil spring 42 is displaced so as to increase the torque it exerts. The torque adaptor 31 and the cover plate 48 are both also affixed to the second ratchet wheel 36. Therefore, as torque is applied to displace the coil spring 42, the ratchet wheel 36 advances and its counter rotation is resisted by the second pawl 34.

Also visible in FIG. 5 is a first end 43 of the coil spring 42 which is preferably inserted into a hole in the cover plate 48 and restrained thereby. A second end 45 of the coil spring 42 is preferably removably affixed to a cylindrical tube 46. The tube may contain a slit, slot, hole, or other such feature for attaching the spring thereto, and is fixedly attached to the spring collar 50.

The shaft 32 passes through the side plate 20 of the winch casing 100 and is free to rotate and control the tension in the restraining means 10. Thus, it can be seen that when the tension in the restraining means 10 is reduced, the force exerted by the torque created in the coil spring 42 will tend to rotate the shaft in the direction of increasing the tension in the restraining means 10 and accordingly, will advance the first ratchet wheel 26. Thus, once any slack is accumulated, the restraining means is locked into the tighter position.

Figure 6:
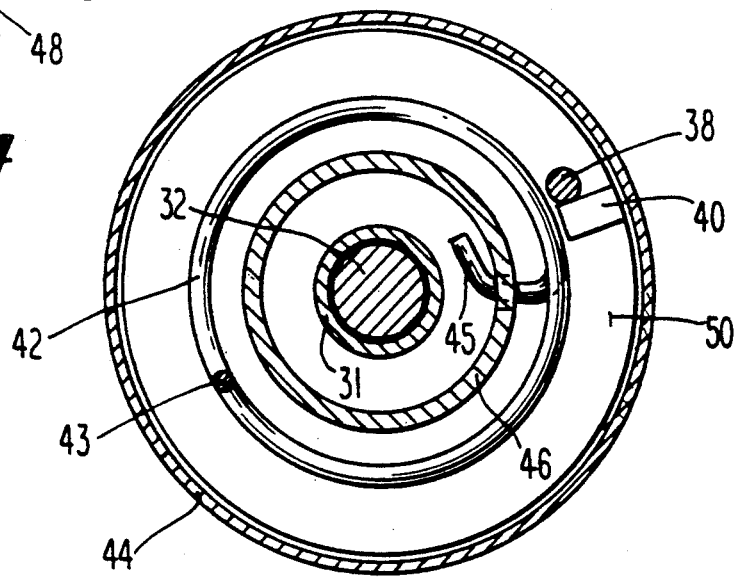
FIG. 6 is a partial cross-section of a side elevation view taken along line 6—6 in FIG. 5.

FIG. 6 is a partial cross-section of a side elevation view taken along line 6-6 in FIG. 5, and shows the relative locations of the spring stop 38, the spring stop block 40, and the attachment of the second end 45 of the coil spring 42. The spring stop 38 and the first end 43 of the coil spring 42 are preferably removably attached to the spring cover plate (not shown). The second end 45 of the coil spring 42 is preferably removably attached to the cylindrical tube 46, which tube is fixedly attached to the spring collar 50. The spring stop block 40 is also fixedly attached to the spring collar 50, which spring collar 50 is fixedly attached to the shaft 32. All of the above are located within the spring housing 44.

Although the constant tension winch of the present invention need not be mounted in any particular orientation or in any particular manner, a typical application is illustrated in FIG. 2. As shown, the winch of the present invention may preferably be mounted in an underslung configuration, for instance on the underside of a rail car 200. As explained above, the restraining means 10 is withdrawn from its stored position by unwinding it from the shaft 32. The first ratchet wheel 26 and pawl 24 would normally prevent the restraining means 10 from being withdrawn in the direction illustrated, however, as explained above, the pawl 24 may be withdrawn to the position illustrated in FIG. 2, thereby permitting the ratchet wheel 26 and shaft 32 to turn freely.

In one embodiment of the present invention (not illustrated), the pawl 24 (and similarly the second pawl 34 not seen in this view) will have a substantially arcuate shaped portion opposite the pawl tooth. Most preferably, the radius of the arcuate cutout will be about twice the radius of the ratchet wheel 26. The provision of this arcuate section permits the pawl 24 to substantially conform to the curvature of the ratchet wheel 26 in a manner which substantially eliminates the likelihood of the ratchet teeth "bumping" the pawl 24 into the engaged position.

The winch of the present invention will lend itself to numerous applications. Accordingly, the size of the components described and the levels of tension and force required will be dictated by the loading conditions and other parameters readily ascertained by those of ordinary skill. Similarly, certain embodiments of the present invention have been described with particularity and illustrated together in a preferred embodiment. Those of ordinary skill will realize, however, that numerous variations to the structures described above will be more or less applicable to different applications. Moreover, certain other embodiments and variations to the present invention will be readily gleaned form the teachings of the instant specification. Accordingly, reference should be made to the appended claims to determine the scope of the present invention.

What is claimed is:

1. Constant tension winch apparatus for manipulating means for restraining a load, comprising:

a frame comprising at least two parallel spaced apart side plates, each of the side plates comprising means for receiving a shaft;

a hinged cover plate disposed between the side plates, the cover plate comprising a guide for preventing abrasion of a means for restraining a load;

a shaft for retaining the restraining means, the shaft having a first end and a second end, the first end and second end extending through opposing means for receiving a shaft, the shaft further comprising first and second adapter means for receiving means for applying torque;

a first ratchet wheel affixed to the first end of the shaft;

a first ratchet pawl means for engaging the first ratchet wheel;

a second ratchet wheel affixed to the second end of the shaft;

a second ratchet pawl means for engaging the second ratchet wheel;

a coil spring means for exerting a force between the second ratchet wheel and the shaft, the coil spring having a diameter greater than the diameter of the shaft and being disposed between the frame and the second ratchet wheel; and a spring stop attached to a spring cover plate affixed to the second ratchet wheel, the spring stop cooperating with a spring stop block that is attached to a spring collar fixedly attached to the shaft, wherein upon one full rotation of the spring cover plate the spring stop contacts the spring stop block, thereby precluding further rotation of the spring cover plate and protecting the coil spring from excess torque, whereby the restraining means is placed in tension by operation of the first ratchet wheel, and the coil spring is displaced to create an urging force to rotate the shaft and advance the first ratchet wheel upon the reduction of the tension in the restraining means.

2. The apparatus of claim 1, further comprising a locking bar affixed to the hinged cover plate, whereby the distal end of the restraining means is engageable with the locking bar and when the restraining means is placed in tension the hinged cover plate is prevented from being removed.

3. The apparatus of claim 1, wherein the first ratchet pawl means comprises tooth means for engaging the first ratchet wheel to regulate the direction of its rotation.

4. The apparatus of claim 1, wherein the second ratchet pawl means comprises tooth means for engaging the second ratchet wheel to regulate the direction of its rotation.

5. The apparatus of claim 1, wherein the coil spring means comprises a flat coil spring.

6. The apparatus of claim 1 wherein a first end of the coil spring is affixed to the spring cover plate and a second end of the coil spring is affixed to a spring housing comprising a cylindrical tube fixed attached to the spring collar.

7. The apparatus of claim 1 wherein the soil spring means comprises a cylindrical coil spring.

8. A constant tension winch, comprising:
 (a) a winch frame;
 (b) a means for restraining a load;
 (c) a shaft for retaining the restraining means, the shaft having a first end and a second end;

(d) means for applying a constant tension to the restraining means, comprising:
  (i) a first ratchet means directly connected to the first end of the shaft which limits rotation in a first direction;
  (ii) a second ratchet means rotatably connected to the second end of the shaft which limits rotation in the first direction; and
  (iii) a coil spring means for urging against the second ratchet means and the shaft, the coil spring having a diameter greater than the diameter of the shaft and being disposed between the winch frame and the second ratchet means;
(e) a hinged cover plate attached to the winch frame, the hinged cover plate comprising a guide for preventing abrasion of the restraining means; and
(f) a spring stop attached to a spring cover plate affixed to the second ratchet means and a spring stop block attached to a spring collar that is fixedly attached to the shaft, wherein upon one full rotation of the spring cover plate, the spring stop contacts the spring stop block, thereby precluding further rotation of the spring cover plate and protecting the coil spring from excess torque, whereby an initial tension is created in the restraining means by the operation of the first ratchet means, and an urging force is created by rotating the second ratchet means to displace the coil spring, and upon a reduction in the tension of the restraining means the coil spring causes the rotation of the shaft and the first ratchet means.

9. The apparatus of claim 8, further comprising adapter means for applying a torque affixed to the second ratchet means and rotatably connected to the shaft.

10. The apparatus of claim 8 wherein the coil spring means comprises a cylindrical coil spring.

* * * * *